(12) United States Patent
Jolly

(10) Patent No.: US 6,981,116 B2
(45) Date of Patent: Dec. 27, 2005

(54) SYSTEM AND METHOD FOR INFORMATION CONTROL BLOCK TRACKING STREAMS FOR UNIVERSAL DISK FORMAT FILE SYSTEMS

(75) Inventor: Thomas Ewan Jolly, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 666 days.

(21) Appl. No.: 10/186,900

(22) Filed: Jun. 28, 2002

(65) Prior Publication Data

US 2003/0172226 A1 Sep. 11, 2003

Related U.S. Application Data

(60) Provisional application No. 60/362,221, filed on Mar. 6, 2002.

(51) Int. Cl.$^7$ ............................................. G06F 12/00
(52) U.S. Cl. .................. 711/163; 711/164; 711/173; 707/9; 707/205; 386/69; 386/70; 386/125; 386/126; 369/272; 360/72.1
(58) Field of Search .................. 711/163, 164, 173; 707/9, 205; 386/69, 70, 125, 126; 369/272; 360/72.1

(56) References Cited

U.S. PATENT DOCUMENTS

| | | | |
|---|---|---|---|
| 5,613,082 A | 3/1997 | Brewer et al. | ............... 395/404 |
| 6,732,192 B2 * | 5/2004 | Todo et al. | ..................... 710/3 |
| 6,873,789 B1 * | 3/2005 | Nakamura et al. | ........... 386/125 |
| 2003/0190146 A1 * | 10/2003 | Gotoh et al. | ................... 386/70 |

OTHER PUBLICATIONS

Universal Disk Format Specification, Mar. 15, 2000, OSTA.org, Rev. 2.01, pp 1-145.*
Universal Disk Format Specification, Apr. 30, 2003, OSTA.org, Rev. 2.50, pp 1-159.*

* cited by examiner

*Primary Examiner*—Donald Sparks
*Assistant Examiner*—Bao Q. Truong
(74) *Attorney, Agent, or Firm*—Merchant & Gould P.C.; Joshua W. Korver

(57) ABSTRACT

A system and method for providing information control block (ICB) tracking streams for Universal Disk Format (UDF) file systems. The streams assist in tracking the location of the ICBs on the media, and promote clustering of ICBs. Both of these factors increase the speed of the UDF file system by greatly reducing the time to scan and locate files.

24 Claims, 7 Drawing Sheets

SYSTEM AND METHOD FOR INFORMATION CONTROL BLOCK TRACKING STREAMS FOR UNIVERSAL DISK FORMAT FILE SYSTEMS

RELATED APPLICATIONS

This application claims the benefit under 35 U.S.C. § 119(e) of U.S. provisional patent Application Ser. No. 60/362,221, filed Mar. 6, 2002.

BACKGROUND OF THE INVENTION

The Universal Disk Format (UDF) is a universal vendor-independent file system format designed for data interchange and portability. UDF allows an operating system to access (read/write/modify) data that was created by another operating system or device. UDF is a subset of, and is fully compliant with, an International Standards Organization (ISO) interchange standard for non-sequential recording (NSR) of data, known as ISO 13346. UDF is the subset of ISO 13346 as defined by the Optical Storage Technology Association (OSTA), a non-profit association for promoting the use of writable optical technologies and products for storage of computer data and images. UDF is a versatile file system supporting a wide variety of media technologies, such as CD, DVD, MO, WORM, and magnetic disk. UDF also builds on top of the ISO 13346 standard adding support for sequential recording media such as CD-R.

UDF is principally utilized for optical storage media. A common property of optical storage devices when compared to fixed discs is that optical drives may have long seek times and relatively low throughputs. When only a few files are being located, these performance issues may be sufficiently small that the user experience is not poor. However, when performing some action that requires access to very many files, the user experience can be frustrating. For example, if a volume of conventional size is checked for errors (e.g., "chkdsk" or "fschk"), every file on the volume is accessed.

SUMMARY OF THE INVENTION

In accordance with the present invention, a system and method provides information control block (ICB) tracking streams for use in Universal Disk Format (UDF) file systems. The invention adds metadata streams for use in a UDF file system. The metadata streams allow tracking of ICBs on UDF storage media to increase the speed of accessing ICBs on the media. Note that although streams are described herein the invention could be implemented using hidden files or EAs in place of streams.

The ICBs are located during a scan of a UDF file system. The ICBs are located to verify and correct volume data structures of the UDF file system. All ICBs are accessed to verify the volume consistency completely. Under the previous standard for UDF, complete hierarchy walks or partition logical block scans were required to locate ICBs since the ICBs were located throughout the UDF partition on the storage media. In contrast, the present invention tracks the regions of the volume where ICBs are stored such that the ICBs are readily locatable in the partition.

The two streams that are utilized by the UDF file system in the present invention are an ICB extent container stream and an ICB bitmap stream. The streams assist in tracking the location of the ICBs on the media, and also promote clustering of ICBs which potentially reduces free space fragmentation (since ICBs are a single block in size) and thus improves general file system performance. The speed of verification of the UDF file system is significantly increased in most cases by almost eliminating the need for exhaustive hierarchy walks and surface scans to locate and access all ICBs.

DETAILED DESCRIPTION OF THE PREFERRED EMBODIMENT

Briefly stated, the present invention includes two Information Control Block (ICB) tracking streams for tracking the location of ICBs on a storage media, wherein the storage media is arranged according to a Universal Disk Format (UDF) file system. An extent of contiguous logical blocks on the UDF volume is allocated for storing ICBs. An ICB extent container stream includes stream allocation units that correspond to the extents. Accordingly, ICBs stored within the extents on the UDF volume are also stored within the ICB extent container stream. Each allocation unit corresponds to an allocation descriptor that describes an extent which may also include other adjacent allocation units. An ICB bitmap stream contains a bitmap describing which logical blocks within the extents allocated to the ICB extent container stream contain ICBs. Accordingly, each ICB is stored in a pre-allocated extent of the UDF volume. When all ICBs then need to be located, the entire volume need not be searched or hierarchy traversed.

Throughout the specification and claims, the following terms take the meanings explicitly associated herein, unless the context clearly dictates otherwise.

The terms "Universal Disk Format" and "UDF" refer to the specification developed by the Optical Storage Technology Association (OSTA) that defines a file system that allows data interchangeability on storage media.

The terms "Information Control Block" and "ICB" refer to a control node within a UDF file system that corresponds to a collection of attributes that define a file and the location of its data.

The term "extent" refers to a group of logical blocks that have a continuous ascending sequence of numeric identifiers (i.e., the logical blocks are contiguous on the disk).

The term "logical block" refers to a unit of disk space used for allocation within a logical volume and within partitions of the volume.

The terms "Logical Block Number" or "LBN" refer to an unsigned number of a specified size used to uniquely identify a logical block within a partition.

The term "allocation unit" refers to an extent in the UDF partition beginning at a LBN which is an integer multiple of some predetermined "allocation unit size" and being an integer multiple of "allocation unit size" blocks in length. A typical value for "allocation unit size" would match the ECC block size of the underlying device, if applicable. For example, the allocation unit size is typically 16 blocks for common DVD rewritable media which has an ECC unit size of 16 sectors.

The term "partition", in UDF, refers to a collection of contiguous logical sectors within a UDF volume, where one physical partition exists per UDF volume.

Illustrative Operating Environment

Figure 1:
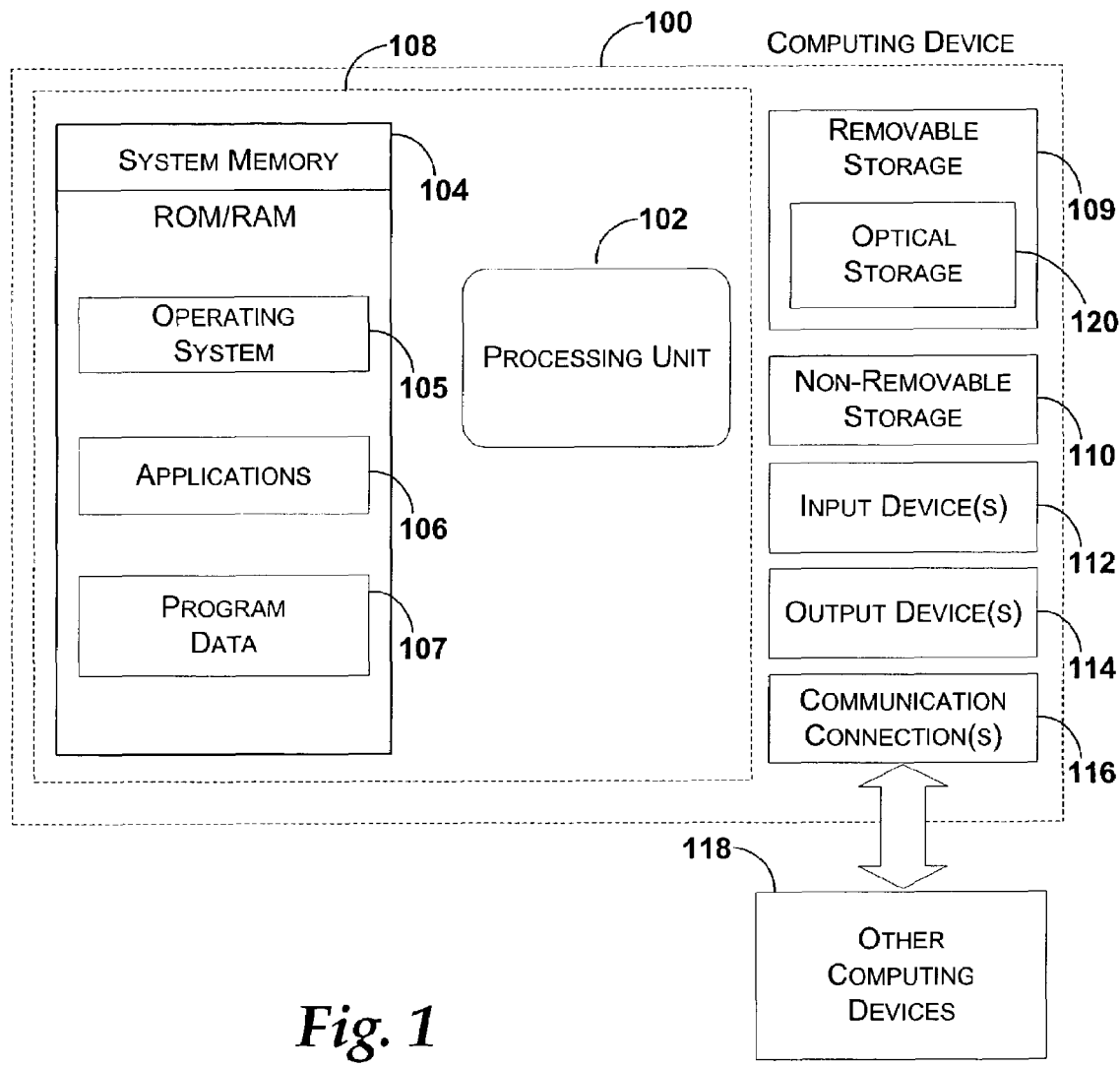
FIG. 1 illustrates an exemplary computing device that may be used in one exemplary embodiment of the present invention.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical storage 120, or tape. Such additional storage is illustrated in FIG. 1 by removable storage 109, optical storage 120, and non-removable storage 110. Computer storage media may include volatile and nonvolatile, removable and non-removable media implemented in any method or technology for storage of information, such as computer readable instructions, data structures, program modules, or other data. System memory 104, removable storage 109, optical storage 120, and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
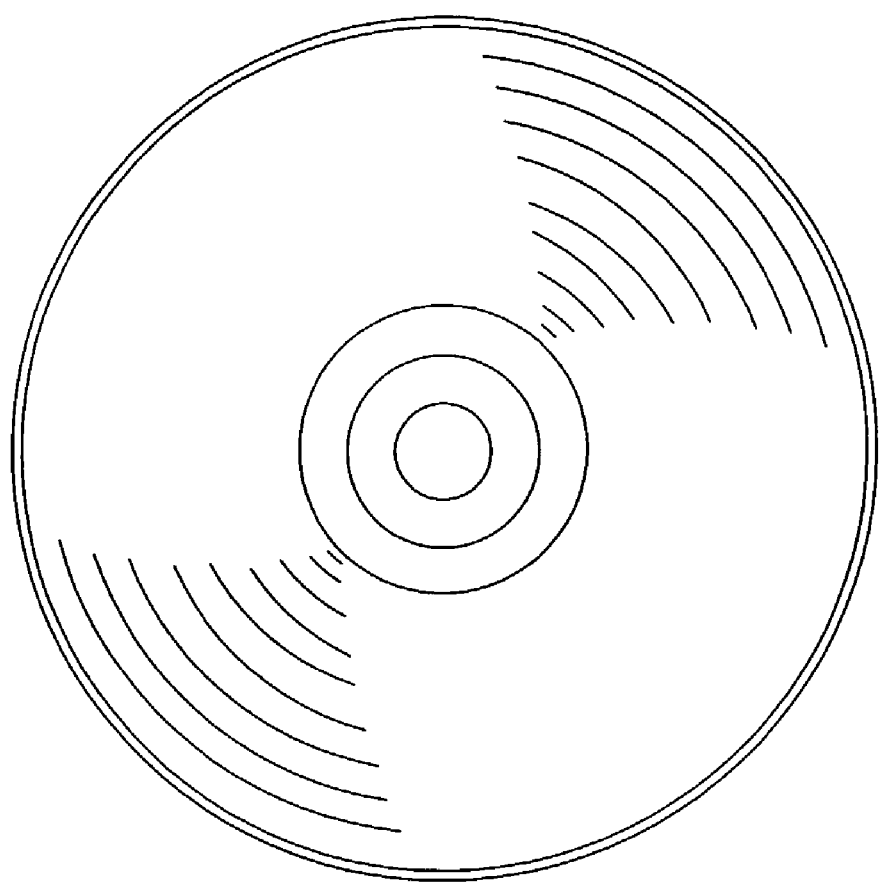
FIG. 2 is an example of an optical storage media that may incorporate a UDF file system in accordance with the present invention.

FIG. 2 illustrates one example of an optical storage medium that may incorporate a UDF file system in accordance with the present invention. As previously stated, optical storage media includes Compact Disks (CDs), Digital Versatile Disks (DVDs), WORM (Write-Once, Read-Many) media, optical jukeboxes, autochangers, and the like. Optical storage media often have the physical profile (200) shown, partially comprising a circular disk with an associated thickness. The physical profile of optical media can vary. Optical storage media can also vary in storage capacity. A UDF file system may be utilized with optical storage media, as well as other media types (e.g., magnetic disk, etc.). Optical disks are typically known for their high capacity, portability, and length of durability in comparison to other media types.

Figure 3:
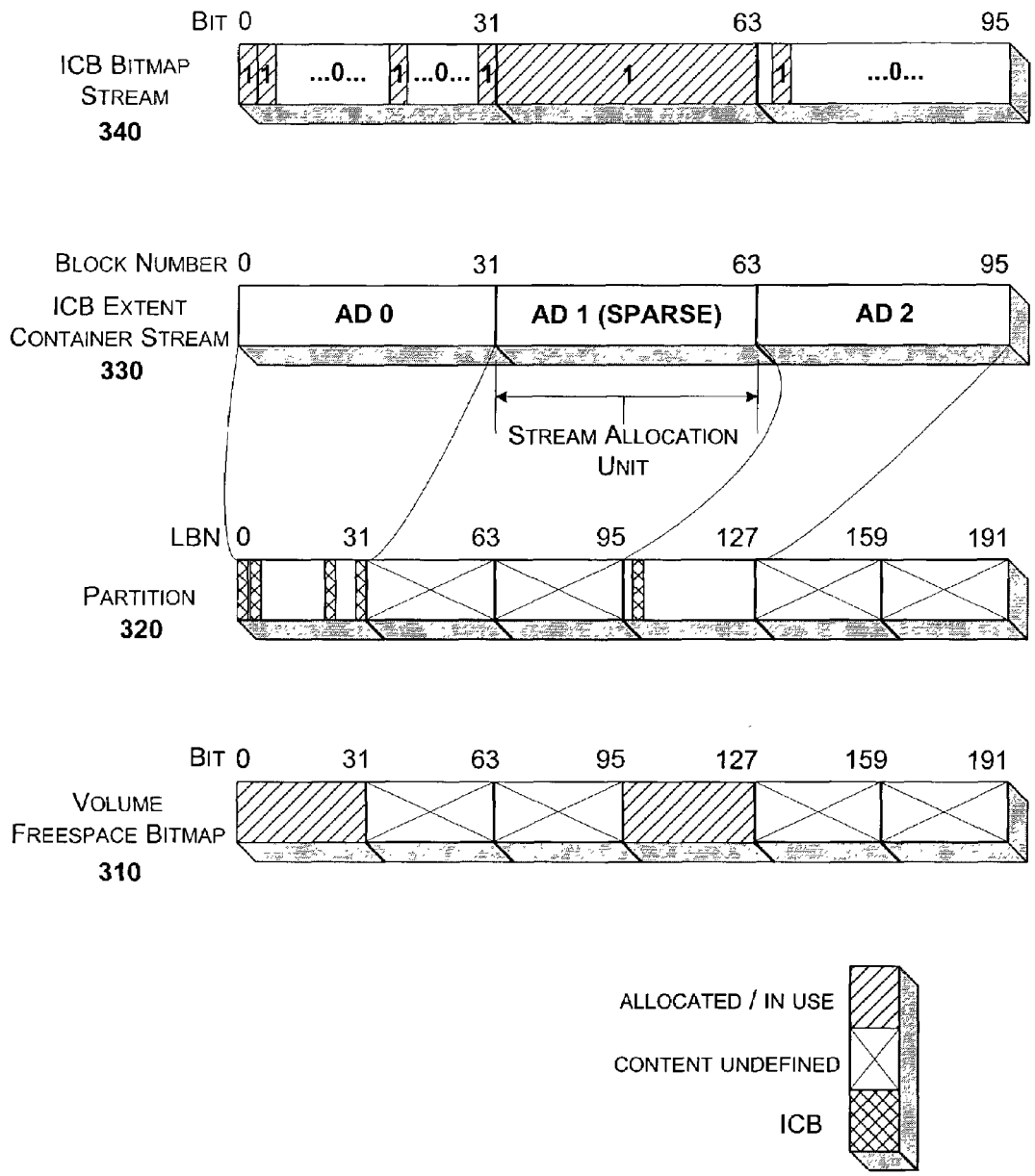
FIG. 3 is an exemplary block diagram of data structures of a UDF file system that includes the ICB tracking streams in accordance with the present invention.

FIG. 3 is an exemplary block diagram of data structures of a UDF file system that includes the ICB tracking streams in accordance with the present invention. The data structures associated with the UDF file system include volume freespace bitmap 310, partition 320, ICB extent container stream 330, and ICB bitmap stream 340.

Volume freespace bitmap 310 is a data structure that includes a bit corresponding to each logical block of partition 320. According to the present invention, a predetermined number or extent of contiguous logical blocks on partition 320 are allocated for storing ICBs (i.e., allocation unit). More than one extent may be allocated within the partition for storing the ICBs. The extents need not be contiguous. In this particular example, 32 contiguous logical blocks of partition 320 correspond to an allocation unit. When a predetermined number of contiguous logical blocks on partition 320 are allocated for storing ICBs, the volume freespace bitmap 310 reflects the allocation by designating the bits corresponding to those logical blocks (e.g., 0–31, 95–127) as allocated or in use (see legend). Accordingly, since the volume freespace bitmap 310 lists these contiguous logical blocks as allocated, these logical blocks are reserved for storing ICBs. Volume freespace bitmap 310 assists in preventing other types of data from being stored within these contiguous logical blocks.

Partition 320 is comprised of logical blocks and corresponds to the actual data on disk. As previously stated, a predetermined number of contiguous logical blocks on partition 320 are allocated for storing ICBs (e.g., 0–31). Each logical block is designated by a logical block number (LBN). Each LBN has a corresponding bit in volume freespace bitmap 310. A logical block may include an ICB in one of the contiguous logical blocks allocated for storing ICBs. Other logical blocks of partition 320 comprise undefined content with respect to ICB tracking. The undefined content may include data associated with any number files located on Partition 320.

ICB extent container stream 330 is one of the two streams generated for a UDF file system to assist in tracking the ICBs within the volume of a UDF storage media. ICB extent container stream 330 includes stream allocation units that are identified according to sequential allocation descriptors (ADs). One AD may identify multiple contiguous allocation units. Each stream allocation unit corresponds to each extent of contiguous logical blocks in partition 320 that are, or were, allocated to store ICBs. The minimum size of the stream allocation units for this stream is predetermined. According to the example shown, the minimum size for each stream allocation unit is 32 blocks. The AD for each stream allocation unit provides a number of different functions for the ICB extent container stream 330. In the case of non-sparse extents, the AD references logical blocks that are marked as allocated in volume freespace bitmap 310. The AD is either of a type "allocated and recorded" or type "not allocated". The AD describes a number of logical blocks that is an integer multiple of the stream allocation unit. In the example provided, where each allocation unit is comprised of 32 logical blocks, the AD may be utilized to describe 32, 64, 128, etc. logical blocks for partition 320. The AD may be added or removed from extents. In the example provided, an AD may be added or removed in an extent that starts at logical block 32 and is 32 logical blocks in length. Correspondingly, an AD may be added or removed in an extent that starts at logical block 64 and is 128 logical blocks in length. Each AD references a contiguous extent of logical blocks in partition 320 and is stored in the extent container stream ICB or an associated AD continuation extent.

ICB bitmap stream 340 is the other one of the two streams generated for a UDF file system to assist in tracking the ICBs within the volume of a removable storage media. ICB bitmap stream 340 includes a bitmap describing which of blocks are allocated and storing ICBs in the ICB extent container stream 330. Each bit of ICB bitmap stream 340 corresponds to a block within ICB extent container stream 330. For example, bit zero of ICB bitmap stream 340 corresponds to the first block in the ICB extent container stream 330, and bit one corresponds to the second block. If a bit in ICB bitmap stream 340 is clear (i.e., zero), then the corresponding logical block of partition 320 referenced by ICB extent container stream 330 is available for use by an ICB. If a bit in ICB bitmap stream 340 set, the corresponding logical block of partition 320 referenced by ICB extent container stream 330 is in use by an ICB, or falls within a sparse region of ICB extent container stream 330 and thus does not correspond to any logical block.

When ICB extent container stream 330 and ICB bitmap stream 340 are first generated, predetermined logical blocks within the extents are reserved to represent ICB extent container stream 330 and ICB bitmap stream 340. In other words, an ICB located on the partition is the ICB for ICB extent container stream 330, describing the attributes of ICB extent container stream 330. In another embodiment, an ICB located on the partition is the ICB for ICB bitmap stream 340, describing the attributes of ICB bitmap stream 340.

In a further embodiment, the ICB extent container stream 330 and the ICB bitmap stream 340 have an associated information length. The associated information length indicates the size in bytes of ICB extent container stream 330 and ICB bitmap stream 340.

In yet another embodiment, each ICB stored on partition 320 includes a reference entry to the offset of the block within ICB extent container stream 330. The offset corresponds to the block number of the block within ICB extent container stream 330. During de-allocation of an ICB, the offset is utilized to locate the bit corresponding to the de-allocated ICB within ICB bitmap stream 340. An exemplary process for de-allocating ICBs is described further in connection with FIG. 7 below.

Figure 4:
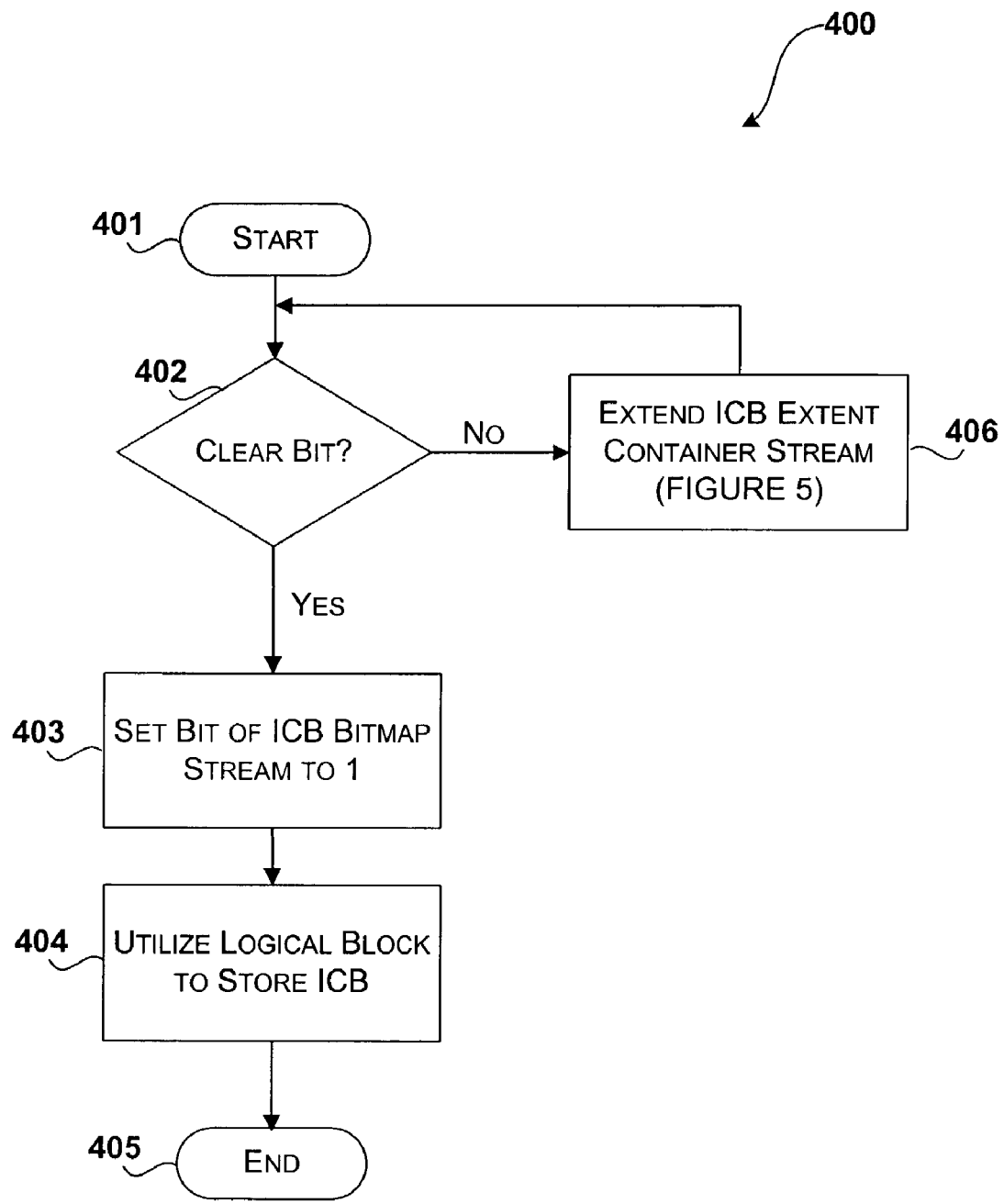
FIG. 4 is a logical flow diagram for allocating a new ICB in accordance with the present invention.

FIG. 4 is a logical flow diagram for allocating a new ICB in accordance with the present invention. The process enters at starting block 401, where an ICB extent container stream and ICB bitmap stream have been previously generated for a UDF file system, and a new ICB is to be allocated. The process 400 continues at decision block 402.

At decision block 402, a determination is made whether a clear bit is available within the ICB bitmap stream. Searching the ICB bitmap stream and locating a bit with a zero value corresponds to locating a block within ICB extent container stream. The block located within the ICB extent container stream corresponds to a logical block on the partition that is available to be allocated as an ICB. If a clear bit is located within the ICB bitmap stream, processing continues at block 403. If, however, no clear bits are available within the ICB bitmap stream for allocating a new ICB, then processing moves to block 406.

Figure 5:
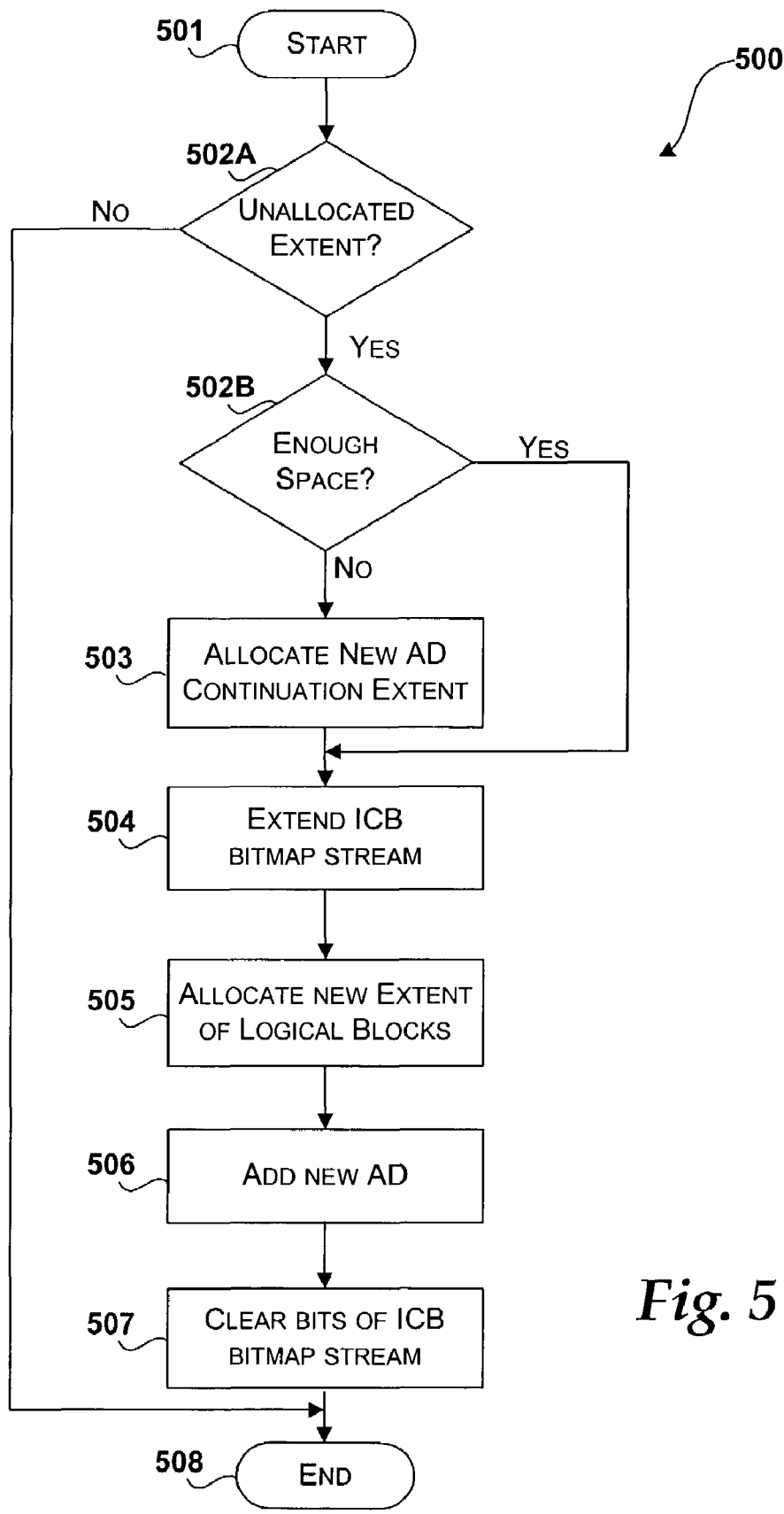
FIG. 5 is a logical flow diagram for extending an ICB container stream in accordance with the present invention.

At block 406, a process similar to process 500 shown in FIG. 5 is utilized to extend the ICB extent container stream to provide further allocated logical blocks on the partition available for storing ICBs. Once more logical blocks are available for storing ICBs, processing returns to block 402.

At block 403, the clear bit located within the ICB bitmap stream is set to "1". Setting the bit to "1" indicates that a logical block of the partition referenced by the ICB extent container stream block corresponding to the set bit may then be used for the new ICB. Processing continues at block 404.

At block 404, the new ICB is stored within the logical block of the partition that corresponds to the set bit. The offset within the ICB container stream of the logical block containing the ICB is stored in the ICB. Processing continues to block 405, where processing ends.

FIG. 5 is a logical flow diagram for extending an ICB container streams in accordance with the present invention. The process enters at starting block 501, where an ICB extent container stream has been previously generated for a UDF file system. The process 500 continues at decision block 502.

At decision block 502B, a determination is made whether there is an extent of unallocated logical blocks in the partition satisfying the size and alignment requirements previously stated for an allocation unit. If there is no such extent, process 500 fails and moves to block 508 where processing ends. If there is an unallocated extent, then processing continues at 502B.

At decision block 502B, a determination is made whether there is enough space in the ICB extent container stream ICB or associated AD continuation extent for another AD. The extent container stream ICB and any associated AD continuation extent contain the ADs describing the extents of the ICB extent container stream. If enough space is available to add a new AD, then processing moves to block 504. However, if enough space is not available, processing continues at block 503.

At block 503, a new AD continuation extent for the storage of more ADs is allocated beyond the ADs currently available in the ICB extent container stream and an AD of type "continuation extent" which refers to the new extent is added to the end of the existing ADs in the ICB or last existing AD continuation extent. Processing continues at block 504.

At block 504, the ICB bitmap stream, if required, is extended to correspond with the planned extension of the of ICB extent container stream. The ICB bitmap stream allocation is increased by the number of bits corresponding to the number of blocks which will be added to the ICB extent container stream. Adding to the ICB bitmap stream causes the information length of the ICB bitmap stream to change. The information length is updated to correspond to the increased size of the ICB bitmap stream as result of adding the additional bits. Processing continues at block 505.

At block 505, a contiguous extent of logical blocks is allocated from the partition to correspond to the added AD continuation extent of the ICB extent container stream by marking the corresponding bits in the volume bitmap as allocated. The extent satisfies the constraints defined previously for allocation units. Processing continues at block 506.

At block 506, a new allocation descriptor (AD) is added to the ICB extent container stream ADs. The new AD corresponds to, and describes, the contiguous extent of logical blocks that is newly allocated for storing ICBs in the partition. Adding the new AD to the ICB extent container stream causes the information length of the ICB extent container stream to change. The information length is updated to correspond to the increased size of the ICB extent container stream as result of adding the extent. Processing continues at block 507.

At block 507, the bits of the ICB bitmap stream corresponding to the new extent added to the ICB extent container stream are cleared (i.e., set to zero). Clearing the bits signifies that corresponding extent of logical block in the partition are available to be used for ICBs. After clearing the appropriate bits, processing continues to block 508 where processing ends.

Figure 6:
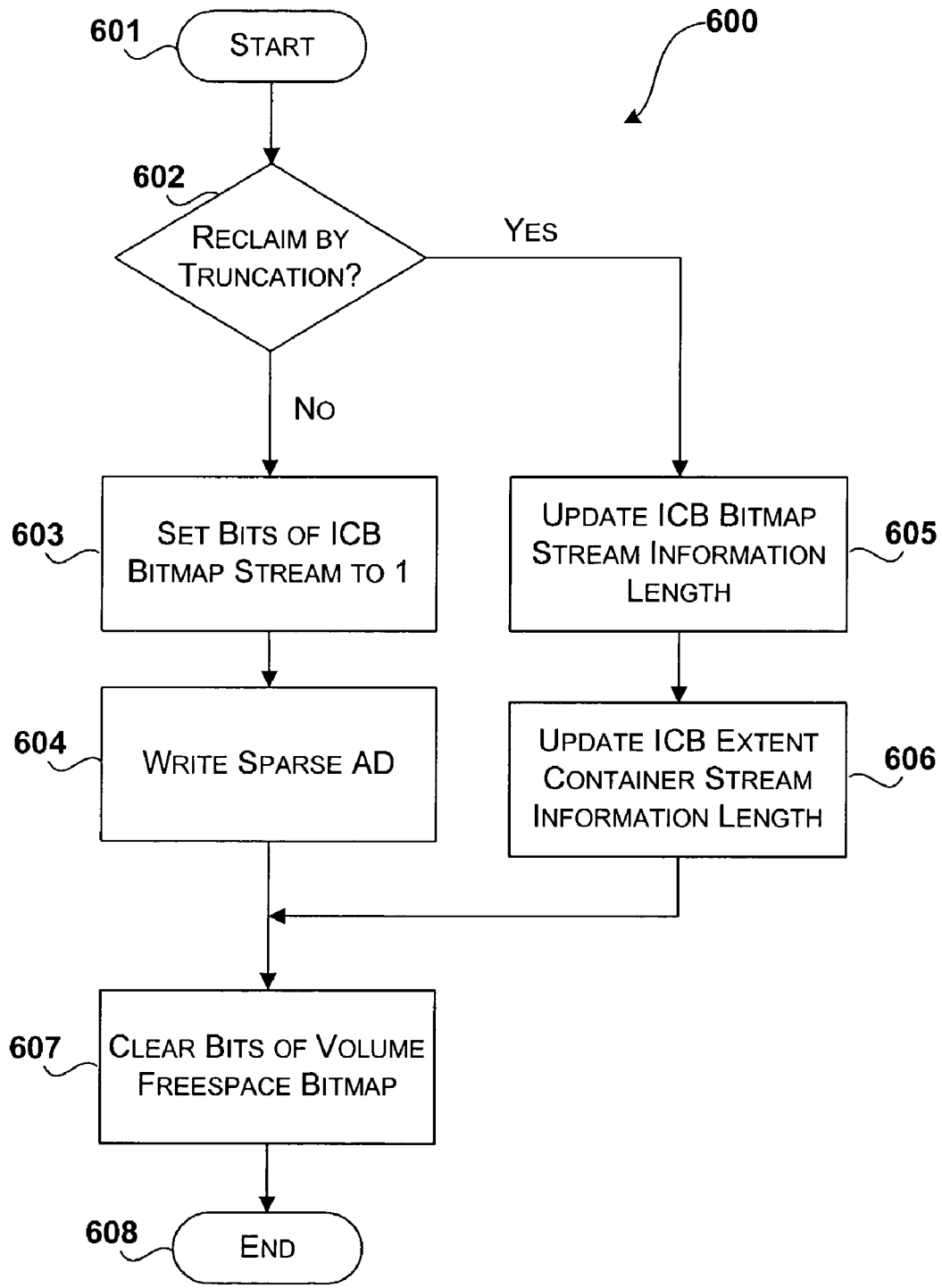
FIG. 6 is a logical flow diagram for reclaiming space from an ICB container stream in accordance with the present invention.

FIG. 6 is a logical flow diagram for reclaiming partition space from an ICB container stream in accordance with the present invention. The process enters at starting block 601, where a decision has previously been made to reclaim a portion of the ICB extent container stream to the volume. In one embodiment, the extent(s) of the ICB extent container stream available to be reclaimed are extents that do not currently contain any active ICBs. The process 600 continues at decision block 602.

At decision block 602, a determination is made whether the portion of the ICB extent container stream will be reclaimed by truncating the ICB extent container stream. If a decision is made to truncate the ICB extent container stream, then processing moves to block 605. However, if a decision is made to reclaim a portion of the ICB extent container stream without truncating the ICB extent container stream, processing continues at block 603.

Blocks 603 and 604 provide a method for reclaiming a portion of the ICB extent container stream to the volume without truncating the ICB extent container stream. At block 603, the bits of the ICB bitmap stream corresponding to the extent(s) of the ICB extent container stream are set to "1". As the extent(s) being reclaimed did not include any ICBs, each bit of the extent(s) is changed from a cleared state ("0") to a set state ("1"). Setting the bits to "1" indicates that the logical blocks of the partition corresponding to those bits are no longer available for storing ICBs. Processing continues at block 604.

At block 604, the allocation descriptor (AD) of the extent being reclaimed from the ICB extent container stream is written to so that the extent is described as "sparse" (not referencing any logical blocks). This may require splitting of the AD if it describes both the now de-allocated extent and other contiguous but still allocated extents. The sparse AD allows other data to be stored on the volume, to be stored within the freed space of the ICB extent container stream. Processing continues to block 607.

Blocks 605 and 606 provide a method for reclaiming a portion of the ICB extent container stream to the volume by truncating the ICB extent container stream.

At block 605, the information length associated with the ICB bitmap stream is updated to eliminate a portion of the bits corresponding to at least one stream allocation unit of the ICB extent container stream. By updating the information length, the ICB bitmap stream is essentially shortened, and a predetermined number of bits are removed from the ICB bitmap stream. Processing continues at block 606.

At block 606, the information length associated with the ICB extent container stream is updated to correspond to the change of the information length associated with the ICB bitmap stream. The each bit of the ICB bitmap stream corresponds to a block of the ICB extent container stream. With the bits of the ICB bitmap stream removed, the blocks of the extent(s) corresponding to those bits in the ICB extent container stream are also removed. The information length associated with the ICB extent container stream is updated to correspond to the removed extent(s). The portions of ICB container stream AD(s) describing of the extent(s) truncated from the extent container stream are removed. Processing continues at block 607.

At block 607, the bits of the volume freespace bitmap corresponding to the blocks of the extent(s) reclaimed to the volume are cleared. Clearing the bits indicates that the logical blocks are available for storing types of data within the UDF file system other than ICBs. Once the volume freespace bitmap reflects that the extent(s) are de-allocated, processing continues to block 608 where processing ends.

Figure 7:
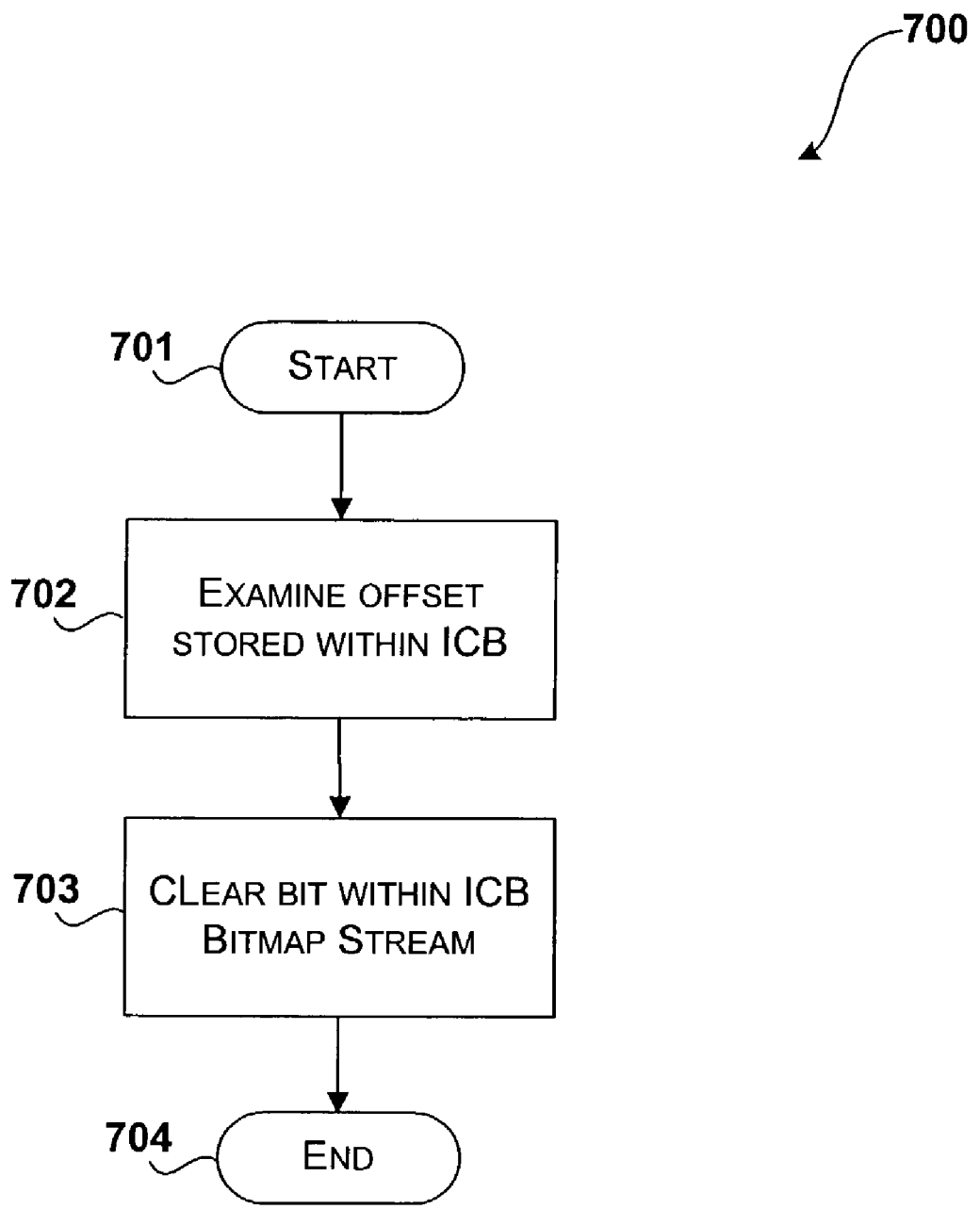
FIG. 7 is a logical flow diagram for de-allocating an ICB in accordance with the present invention.

FIG. 7 is a logical flow diagram for de-allocating an ICB in accordance with the present invention. The process enters at starting block 701, where an ICB stored on the partition is to be de-allocated. De-allocating the ICB clears the logical block on the volume to store a different ICB. The process 700 continues at block 702.

At block 702, an offset (see discussion of FIG. 3) stored within the ICB when the ICB was created is examined to determine the location of the block corresponding to the ICB in the ICB extent container stream and hence the corresponding bit in the ICB bitmap stream. Processing continues at block 703.

At block 703, the bit within the ICB bitmap stream corresponding to the block located within the ICB extent container stream is cleared (e.g., set to zero). Clearing the bit makes the corresponding block available for use by another ICB. Processing continues at block 704, where processing ends.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A method for using information control block tracking streams in a Universal Disk Format (UDF) file system, the method comprising:

allocating at least one extent on a UDF volume for storing information control blocks, the at least one extent comprising logical blocks arranged to store an information control block;

setting bits within a volume freespace bitmap that correspond to the at least one extent, the set bits indicating that the logical blocks have been allocated;

generating an extent container stream that includes the at least one extent, the at least one extent identified by an allocation descriptor within the extent container stream;

generating a bitmap stream that includes a bit corresponding to each logical block within the extent container stream; and setting particular bits within the bit stream, wherein the particular bits correspond to logical blocks that include information control blocks.

2. The method of claim 1, further comprising creating a new information control block by setting a bit within the bitmap stream and using the corresponding logical block to store the new information control block.

3. The method of claim 1, further comprising extending the extent container stream by allocating a new extent within the extent container stream.

4. The method of claim 3, wherein extending the extent container stream further comprises:
   allocating a new extent on the UDF volume;
   generating a new allocation descriptor within an information control block or an allocation descriptor continuation extent associated with the extent container stream, wherein the new allocation descriptor corresponds to the new extent; and
   allocating more bits in the bitmap stream that correspond to the new extent.

5. The method of claim 1, further comprising reclaiming the at least one extent to the UDF volume when the bits within the bitmap stream corresponding to the at least one extent are clear.

6. The method of claim 5, wherein reclaiming the at least one extent further comprises:
   setting the bits within the bitmap stream corresponding to the at least one extent to indicate that the logical blocks of the at least one extent are unavailable for storing information control blocks;
   updating the allocation descriptor to indicate that the at least one extent is considered sparse; and
   clearing the bits of the volume freespace bitmap to indicate that corresponding logical block of the UDF volume are unallocated.

7. The method of claim 5, wherein reclaiming the at least one extent further comprises:
   truncating the bitmap stream to eliminate the bits corresponding to the at least one extent from the bitmap stream such that an associated information length of the bitmap stream is updated to reflect the resultant fewer number of bits within the bitmap stream; and
   truncating the extent container stream to eliminate the logical blocks corresponding to the bits removed from the bitmap stream from the extent container stream such that an associated information length of the extent container stream is updated to reflect the resultant fewer number of logical blocks associated with the extent container stream.

8. The method of claim 1, further comprising de-allocating an information control block when a file that corresponds to the information control block is deleted from the UDF volume.

9. The method of claim 8, wherein de-allocating an information control block further comprises:
   examining an offset stored within the information control block, wherein the offset identifies a position within the extent container stream of a logical block storing the information control block to be de-allocated; and
   clearing the bit within the bitmap stream corresponding to the logical block within the extent container stream.

10. A computer-readable storage medium having computer-executable components, comprising:
    a first component for representing at least one extent of logical blocks within a Universal Disk Format (UDF) volume, wherein the at least one extent is allocated to store information control blocks; and
    a second component that includes bits, wherein each bit corresponds to a logical block within the first component such that particular bits are set when their corresponding logical blocks include information control blocks.

11. The computer-readable storage medium of claim 10, wherein the at least one extent within the first component is arranged according to a stream allocation unit, wherein the stream allocation unit corresponds to a predetermined number of logical blocks, and the first logical block of the stream allocation unit has a logical block number which is an integer multiple of the predetermined number of logical blocks.

12. A computer-readable storage medium encoded with a data structure, comprising:
    an extent container stream that includes at least one extent and each extent further includes a predetermined number of blocks corresponding to a predetermined number of logical blocks on a Universal Disk Format (UDF) volume, wherein the predetermined number of logical blocks are allocated for storing information control blocks; and
    a bitmap stream that includes a predetermined number of bits corresponding to the predetermined number of blocks within the extent container stream, wherein each bit is set when the block within the extent container stream corresponding to that bit is storing an information control block.

13. The computer-readable storage medium of claim 12, wherein an information control block associated with the extent container stream refers to allocation descriptor continuation extents including an allocation descriptor associated with each extent.

14. The computer-readable storage medium of claim 13, wherein the allocation descriptor indicates whether each extent within the extent container stream is allocated for storing information control blocks.

15. The computer-readable storage medium of claim 12, wherein an information control block associated with the extent container stream includes an allocation descriptor associated with each extent.

16. A computer-readable storage medium having computer-executable instructions for using information control block tracking streams in a Universal Disk Format (UDF) file system, the instructions comprising:
    generating an extent container stream that includes at least one extent, wherein each extent includes a predetermined number of blocks corresponding to a predetermined number of logical blocks on a UDF volume;
    generating an allocation descriptor for each extent within extent container stream, wherein the allocation descriptor identifies each extent within the extent container stream;
    setting bits within a volume freespace bitmap that correspond to each extent, the set bits indicating that the logical blocks have been allocated; and
    generating a bitmap stream that includes a predetermined number of bits corresponding to the predetermined number of blocks within the extent container stream, wherein each bit is set when the block corresponding to that bit is storing an information control block or is unavailable for storing an information control block.

17. The computer-readable storage medium of claim 16, further comprising identifying a new information control block by setting a bit within the bitmap stream and using a corresponding one of the predetermined number of blocks to store an information control block when a clear bit is available within the bitmap stream.

18. The computer-readable storage medium of claim 16, further comprising extending the extent container stream by allocating a new extent within the container stream.

19. The computer-readable storage medium of claim 18, wherein extending the extent container stream further comprises:
   allocating a new extent on the UDF volume;
   generating a new allocation descriptor within an information control block or a referenced allocation descriptor continuation extent associated with the extent container stream, wherein the new allocation descriptor corresponds to the new extent; and
   adding more bits to the bitmap stream that correspond to the new extent.

20. The computer-readable storage medium of claim 16, further comprising reclaiming an extent within the extent container stream to the UDF volume when the bits within the bitmap stream that correspond to the at least one extent are clear.

21. The computer-readable storage medium of claim 20, wherein reclaiming an extent further comprises:
   setting the bits within the bitmap stream corresponding to the reclaimed extent to indicate that the logical blocks of the reclaimed extent are unavailable for storing information control blocks; and
   clearing the bits of the volume freespace bitmap to indicate that corresponding predetermined number of logical blocks on the UDF volume corresponding to the reclaimed extent are unallocated.

22. The computer-readable storage medium of claim 21, wherein reclaiming an extent further comprises:
   truncating the bitmap stream to eliminate the bits corresponding to the reclaimed extent such that an associated information length of the bitmap stream is updated to reflect the resultant fewer number of bits within the bitmap stream; and
   truncating the extent container stream to eliminate the logical blocks corresponding to the bits removed from the bitmap stream such that an associated information length and allocation descriptors of the extent container stream are updated to reflect the resultant fewer number of logical blocks associated with the extent container stream.

23. The computer-readable storage medium of claim 16, further comprising de-allocating an information control block when a file that corresponds to the information control block is deleted from the UDF volume.

24. The computer-readable storage medium of claim 23, wherein de-allocating an information control block further comprises:
   examining an offset stored within the information control block, wherein the offset corresponds to the position within the extent container stream of a logical block storing the information control block to be de-allocated; and
   clearing the bit within the bitmap stream corresponding to the logical block to be de-allocated within the extent container stream.

* * * * *